United States Patent
Buttolo et al.

(10) Patent No.: US 10,616,738 B2
(45) Date of Patent: Apr. 7, 2020

(54) METHOD FOR AUTONOMOUS VEHICLE SELECTION WHEN USING A VEHICLE CONTROLLER

(71) Applicant: Ford Global Technologies, LLC, Dearborn, MI (US)

(72) Inventors: Pietro Buttolo, Dearborn Heights, MI (US); Stuart C. Salter, White Lake, MI (US); Annette Lynn Huebner, White Lake, MI (US); Paul Kenneth Dellock, Northville, MI (US); James Stewart Rankin, II, Novi, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 8 days.

(21) Appl. No.: 15/477,864

(22) Filed: Apr. 3, 2017

(65) Prior Publication Data
US 2018/0284761 A1    Oct. 4, 2018

(51) Int. Cl.
| | |
|---|---|
| *H04W 4/80* | (2018.01) |
| *G08C 17/00* | (2006.01) |
| *H04W 4/02* | (2018.01) |
| *H04W 4/20* | (2018.01) |
| *H04W 4/40* | (2018.01) |

(52) U.S. Cl.
CPC ............. *H04W 4/80* (2018.02); *G08C 17/00* (2013.01); *H04W 4/023* (2013.01); *H04W 4/20* (2013.01); *H04W 4/40* (2018.02)

(58) Field of Classification Search
CPC combination set(s) only.
See application file for complete search history.

(56) References Cited

U.S. PATENT DOCUMENTS

| | | | | |
|---|---|---|---|---|
| 5,367,456 A | * | 11/1994 | Summerville | G05D 1/0297 701/24 |
| 2009/0073034 A1 | * | 3/2009 | Lin | G01S 19/49 342/357.32 |
| 2014/0074667 A1 | | 3/2014 | Smith | |
| 2015/0295993 A1 | * | 10/2015 | Hanuschak | H04M 1/6083 715/740 |
| 2016/0264021 A1 | * | 9/2016 | Gillett | B60K 1/04 |
| 2016/0284185 A1 | | 9/2016 | Maison et al. | |
| 2018/0124213 A1 | * | 5/2018 | Wood | H04W 4/023 |

\* cited by examiner

*Primary Examiner* — Adam D Tissot
*Assistant Examiner* — Edward J Pipala
(74) *Attorney, Agent, or Firm* — Michael Spenner; Brooks Kushman P.C.

(57) ABSTRACT

A portable interface, comprising a wireless transceiver configured to emit a short-range wireless signal including an encrypted packet configured to prompt authorized autonomous vehicles to respond to the packet with identification and location data of the vehicles. The portable interface further includes a processor configured to cause the transceiver to emit the signal, and in response to receiving the identification and location data, prompt a notification to be output to a shortest-distance vehicle.

20 Claims, 4 Drawing Sheets

METHOD FOR AUTONOMOUS VEHICLE SELECTION WHEN USING A VEHICLE CONTROLLER

TECHNICAL FIELD

The present disclosure relates to autonomous vehicles and identifying autonomous vehicles.

BACKGROUND

Autonomous vehicles may be equipped with a telematics controller that provides an Internet connection. An Internet connection, however, may not be available in every viable location for the vehicle. For instance, certain areas may not have cellular coverage, or obstacles may block the autonomous vehicle from connecting to the Internet. Furthermore, the autonomous vehicle may not be equipped with an in-vehicle driving interface, such as a steering wheel, shifter and pedal.

SUMMARY

A first embodiment discloses a portable interface comprising a wireless transceiver configured to emit a short-range wireless signal including an encrypted packet configured to prompt authorized autonomous vehicles to respond to the packet with identification and location data of the vehicles. The portable interface further includes a processor configured to cause the transceiver to emit the signal, and in response to receiving the identification and location data, prompt a notification to be output to a shortest-distance vehicle.

A second embodiment discloses a method of communicating with an autonomous vehicle utilizing a portable interface device, comprising outputting a short-range wireless signal including an encrypted packet. The method further includes receiving a response from the vehicle including a vehicle identifier and location data, and in response to the vehicle identifier, sending a request to a shortest-distance vehicle to output a notification signal at the shortest distance vehicle and output the location on a display of a user interface.

A third embodiment discloses an autonomous vehicle, comprising a wireless transceiver configured to receive a Bluetooth Low Energy signal emitted from a portable interface located remotely from the vehicle. The autonomous vehicle further includes a processor configured to, in response to receiving an encrypted packet from the portable interface, send a vehicle identifier and vehicle location utilizing the signal. The processor is also configured to output a notification in response to receiving data indicating the vehicle is a shortest-distance vehicle to the portable interface.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
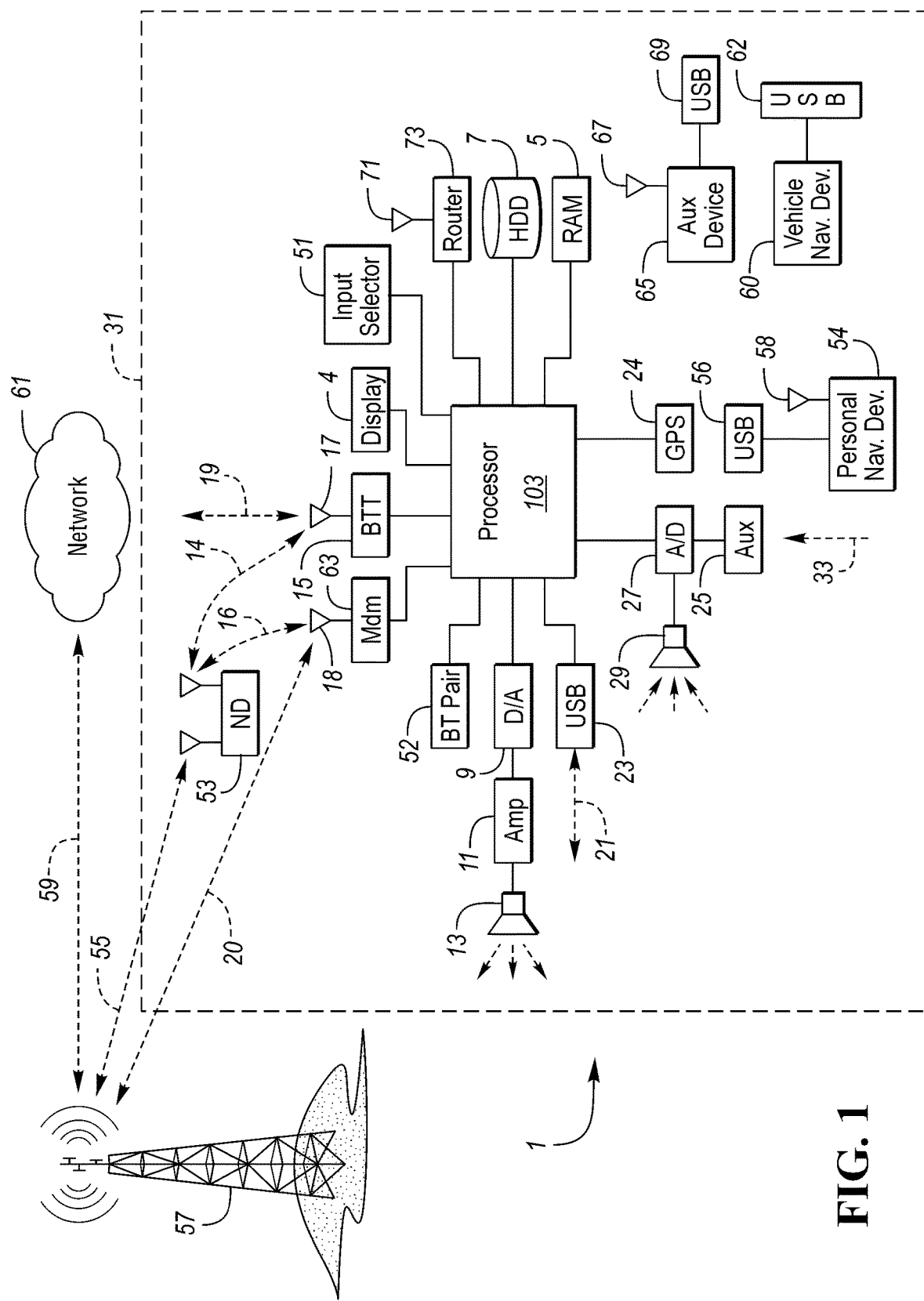
FIG. 1 illustrates an example block topology for a vehicle based computing system for a vehicle.

FIG. 1 illustrates an example block topology for a vehicle based computing system 1 (VCS) for a vehicle 31, which may be an autonomous vehicle. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
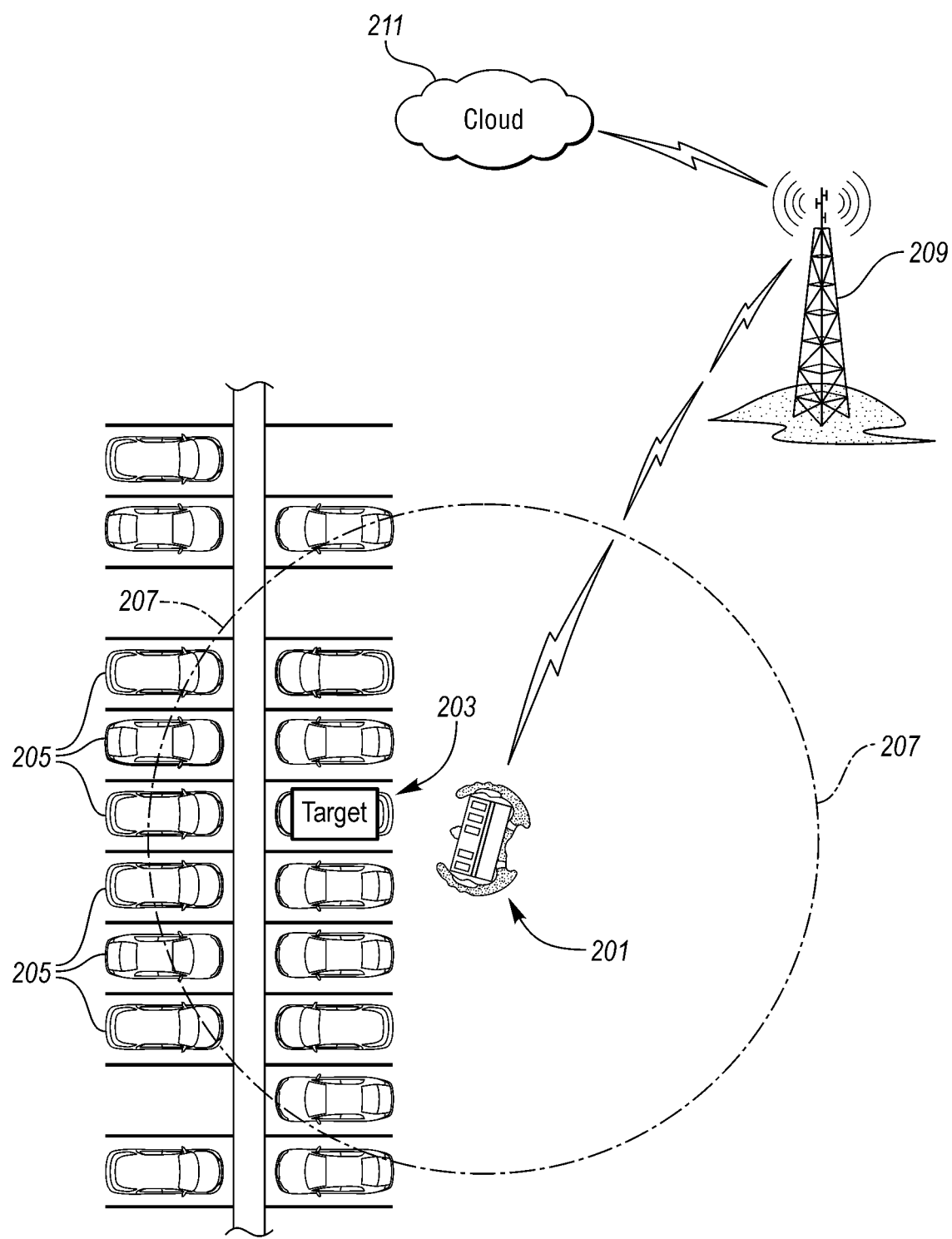
FIG. 2 illustrates a block topology of a vehicle working with a portable vehicle interface.

FIG. 2, a block topology of a handheld device selecting a vehicle. An operator may walk in front of a target vehicle 203, among many, that they may want to connect to utilizing the handheld device 201. The operator may press a button (e.g. identify button) or other input on the PID 201 to start broad casting of a data packet utilizing the Bluetooth low energy (BLE) signal.

The PID may include a processor, memory, and other components typically found in a computer or the like. Additionally, the PID may be a standalone unit, a key fob, or a mobile device (e.g. mobile phone, tablet, etc.). The PID may also be utilized to "manually" drive an autonomous vehicle, either utilizing the PID from inside or outside of the vehicle. The PID may also be capable of initiating "macro requests," such as exit the ramp, move to parking spot A1, etc. The controller may be capable to operate on a fleet of authorized vehicles. An operator may utilize the PID 201 to locate and request access to a vehicle on a list/map utilizing its VIN number, or the operator may just want to walk to a storage area and interactively select a target vehicle.

In one embodiment, an operator of a vehicle may walk in front of a target vehicle, which may be one of many vehicles 205 around, that the operator may want to connect to. The operator may press the identify button a screen or interface of the PID 201. The PID 201 may begin to start broadcasting a data packet utilizing Bluetooth low energy (BLE). The PID 201 may also illuminate a "light" trail made by a vehicle mesh pointing the operator to the desired target. The vehicle may be outfitted with a roof module that includes a BLE transceiver and optional access to vehicle GPS data. The data packet may request listening vehicles to reply with their own coordinates and orientation. The BLE signal 207 is broadcast in a range that's function of the transceiver power, and it's typically around 100 ft but may vary. A target vehicle 203 may connect to the PID 201 when within the range, as well as being able to identify itself.

While the PID 201 may be able to connect to the Internet or off-board server, (e.g. cloud 211) utilizing a Wi-Fi connection, LTE connection, or cellular connection 209, there may be a scenario that the PID 201 does not have access to the cloud 211. For instance, the vehicle may be in a location with no service or ability to connect to the cloud 211. Or while the PID 201 may have a connection to the cloud 211, the target vehicle 203 may not have access to the cloud 211. Thus, the PID 201 will be able to make a connection to the vehicle 203 utilizing BLE or another short-range wireless connectivity method.

The target vehicle may be equipped with an exterior lighting cab that can be used to feedback status information, as described in application titled Autonomous Vehicle Service Lights, Anaqua Docket No. 83795829, which is herein incorporated by reference. The exterior lighting cab may emit various colors that are utilized to identify the vehicle. For example, a first vehicle may emit a red color, a second vehicle may emit a blue color, a third vehicle a purple color, etc. Any number of vehicles can output any number of unique colors for each vehicle. Furthermore, the vehicle may include BLE connectivity and access to a GPS signal. The PID 201 may include a controller that has a handle shaped similar to a steering wheel. Additionally, the PID 201 may include a touch screen as an input/output (I/O) or user interface. The PID may include a small camera mounted on it (e.g. the top side of the PID 201). The PID 201 may also include a gyroscope, magnetometer, accelerometer that may be utilized to determine orientation and motion sensing. The PID 201 may be equipped with a wireless transceiver, such as a LTE/Wi-Fi/Bluetooth/BLE modules for connectivity to various devices and the cloud 211.

Figure 3:
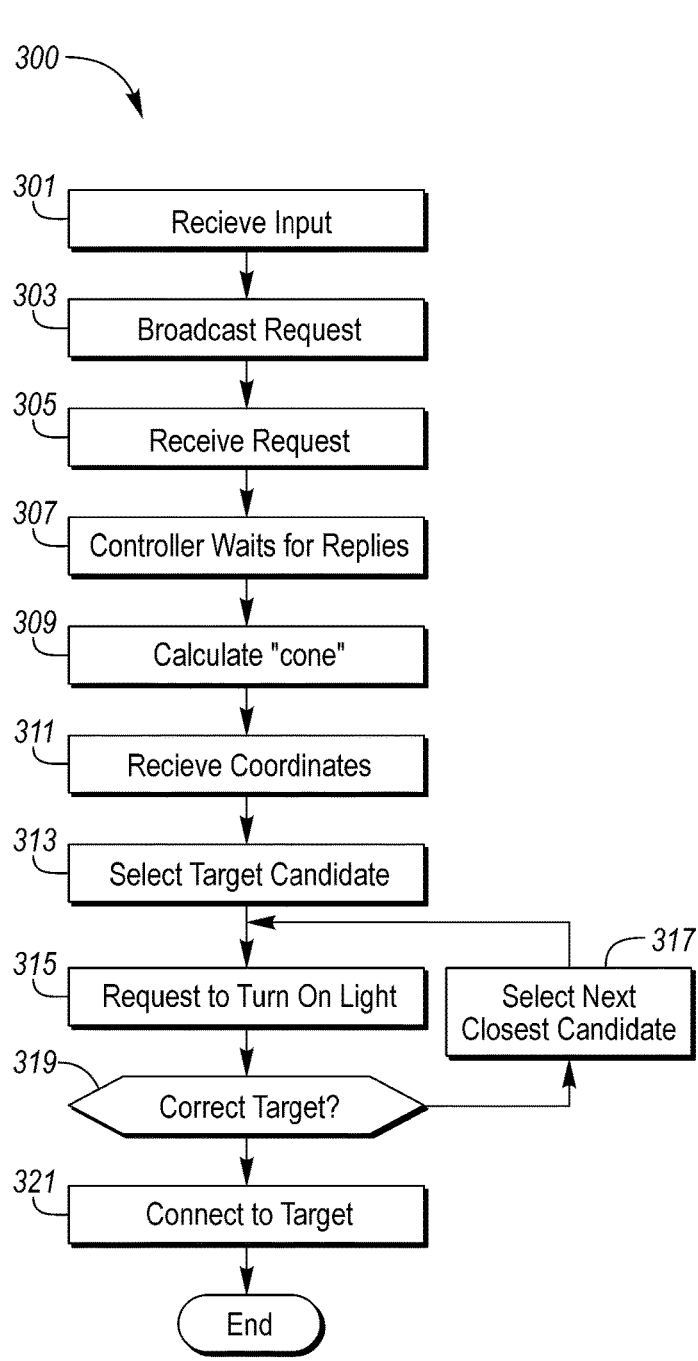
FIG. 3 illustrates an embodiment of a flow chart of the portable interface device communicating with an autonomous vehicle.

FIG. 3 is an illustrative flow chart of the portable interface device communicating with an autonomous vehicle. At step 301, the portable interface device 201 may receive input from a user utilizing the device. An interface of the PID 201 may allow a customer to select a multitude of functions. Such functions may include, vehicle finding (locate vehicle), vehicle alarm triggering (trigger alarm from the vehicle), vehicle identification (identify local vehicles), vehicle retrieval (request vehicle to drive to the PID) and other similar functionality. A user may input a button or utilizing another interface (e.g. touch screen, voice recognition, etc.) to select a functionality.

At step 303, the PID may broadcast or emit a request to nearby vehicle to identify themselves with a unique identification. Furthermore, the request may request the vehicles to emit their location. Other requests may be sent to the vehicles either simultaneously or in parallel. The PID may utilize the low energy Bluetooth signal to emit such requests.

At step 305, the PID may receive one or more replies from the vehicles with the information that the PID requested. The vehicle may be in the Bluetooth low energy range to reply with such information. In one example, the autonomous vehicle may have received a request for location and vehicle identifier information. The vehicle may send data including coordinates (or similar location information) and a vehicle identifier, which may be a vehicle's VIN or another unique number. At step 307, the PID may have a specified time interval or time period to wait for the replies. Thus, the PID may allow communication to be transferred to it during the time period. After the timeout period lapses, the PID may cease to retrieve incoming data and communication.

At step 309, a processor or controller within the PID 201 may calculate a proximity "virtual cone". The "cone" may be calculated based on the location and orientation of the PID 201, which may utilize a gyroscope and/or magnetometer. As a user adjusts the orientation of the PID 201, by pointing the device toward a vehicle, the "virtual" cone will encompass the location of such vehicle. Ideally, the virtual cone is narrow, like a laser tracking light beam. However, the limited accuracy of the location and orientation sensor have the effect of widening the cone away from the device.

At step 311, the PID 201 may receive coordinates from one or more vehicles. The coordinates may be received by vehicles within a range. Coordinates may be received by one or more vehicles, from inside and outside the cone, and a controller of the PID may select only those vehicles whose coordinates are inside the "virtual cone" as target candidates. Other location data, aside from coordinates, may also be sent from the vehicle to the PID 201. For example, the vehicle may send cross streets, an intersection, address, nearby point-of-interest (POI) or altitude of the vehicle to the PID 201.

At step 313, the PID 201 may allow for a user to select a target candidate. In some scenarios, the target candidate may be the vehicle within the shortest distance to the controller of the PID 201. A user interface of the PID 201 may also allow for a user to manually select a specified vehicle that is displayed on a map or a list. A target candidate may also be selected automatically by the PID 201 based on a setting of the PID.

At step 315, the PID 201 may request the vehicle to turn on lights. An interface of the PID 201 may allow a request to be sent to have the vehicle turn on its exterior lighting cab. The request may also include a specific color that should be emitted from the vehicle as selected by the user at the PID 201. The interface of the PID may allow a user to toggle between various vehicles and various colors to be emitted from the exterior lighting cab that are in a vicinity of the PID 201 (e.g. within the BLE range or the "cone").

At step 319, the PID may determine if the correct target was selected. If the correct target is selected at step 319, the vehicle may proceed to attempt to connect to the target vehicle. If the target vehicle is not found, the user may request to find another candidate vehicle at step 317. The PID 201 may calculate utilizing the identifier and location data what the next closest vehicle is to the PID 201. Once a calculation of the next closest vehicle is made, the PID may attempt to connect to the target vehicle.

At step 321, the PID 201 may connect with the correct target. Upon connection, the PID 201 may be utilized to control the vehicle. Data may be transferred back and forth between the PID 201 and the target vehicle upon being connected. As such, additional commands may be sent from the PID to the vehicle (or vice versa) to request the autonomous vehicle to executive specific commands. Such commands may include requests for the vehicle to drive to a specific destination (e.g. to a location of the PID) or to control vehicle functions (e.g. lights on/off, door unlocked/locked, horn on/off, alarm on/off, etc.).

Figure 4:
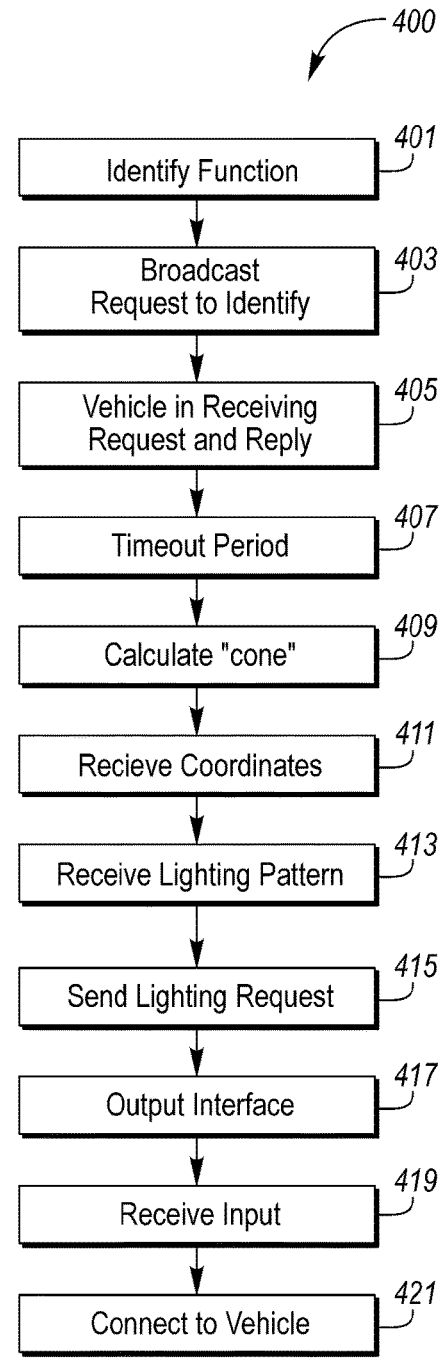
FIG. 4 illustrates another embodiment of a flow chart of the portable interface device communicating with an autonomous vehicle

FIG. 4 is another illustrative flow chart of the portable interface device communicating with an autonomous vehicle. At step 401, the portable interface device 201 may identify a function that is selected from an input received from the device. An interface of the PID 201 may allow a customer to select a multitude of functions. Such functions may include, vehicle finding (locate vehicle), vehicle alarm triggering (trigger alarm from the vehicle), vehicle identification (identify local vehicles), vehicle retrieval (request vehicle to drive to the PID) and other similar functionality. A user may input a button or utilizing another interface (e.g. touch screen, voice recognition, etc) to select a functionality.

At step 403, the PID may broadcast or emit a request to nearby vehicle to identify themselves with a unique identification. Furthermore, the request may request the vehicles to emit their location. Other requests may be sent to the vehicles either simultaneously or in parallel. The PID may utilize the low energy Bluetooth signal to emit such requests.

At step 405, the PID may receive one or more replies from the vehicles with the information that the PID requested. The vehicle may be in the Bluetooth low energy range to reply with such information. In one example, the autonomous vehicle may have received a request for location and vehicle identifier information. The vehicle may send data including coordinates (or similar location information) and a vehicle identifier, which may be a vehicle's VIN or another unique number. At step 407, the PID may have a specified time interval or time period to wait for the replies. Thus, the PID may allow communication to be transferred to it during the time period. After the timeout period lapses, the PID may cease to retrieve incoming data and communication.

At step 409, a processor or controller within the PID 201 may calculate a proximity "virtual cone". The "cone" may be calculated based on an orientation of the PID 201, which may utilize a gyroscope and/or magnetometer, as explained above.

At step 411, the PID 201 may receive coordinates from one or more vehicles. The coordinates may be received by vehicles within a range. Coordinates may be received by one or more vehicles, from inside and outside the cone, and a controller of the PID may select only those vehicles whose coordinates are inside the "virtual cone" as target candidates. Location information of the PID and the vehicles may be utilized to determine a short-distance vehicle from the PID.

At step 413, the vehicle may broadcast an individual signal to each vehicle in the target candidate list, which is received by the PID 201. For example, the wireless signal sent to each vehicle may include an encrypted packet. When the encrypted packet is received at the vehicle, authorized vehicles may be configured to decrypt the packet to understand and read the contents. The At step 415, the PID 201 may send a lighting request to each vehicle, which in turn may activate per the received template. Each vehicle may include its own exterior light that can emit different colored light patterns. The different colored light patterns may be utilized as a notification to notify a user of where each authorized vehicle is located from a distance. The different colored light patterns may correspond to a colored-vehicle that is output on a user interface of the PID 201.

At step 417, the PID 201 may output on a display of the PID 201 a user interface that includes a list of graphical display of candidate vehicles with respective light templates. The user interface of the PID 201 may allow a user to control functionality or selection of the various vehicles found by the PID 201 that may be part of a fleet. Examples of such a user interface may be shown below in FIGS. 5A and 5B.

At step 419, the PID 201 may receive user input from the user interface. The input may be received from a potential driver of the autonomous vehicle and include a selection of the vehicle the potential driver wants to utilize. The user interface may include a touch screen that allows a user to select from several authorized autonomous vehicles.

At step 421, the PID 201 may connect to the vehicle that is selected. Upon connection, the PID 201 may be utilized to control the vehicle. For instance, the vehicle may be sent commands requesting it to drive to the location of the PID or to drive to another location.

Figure 5A:
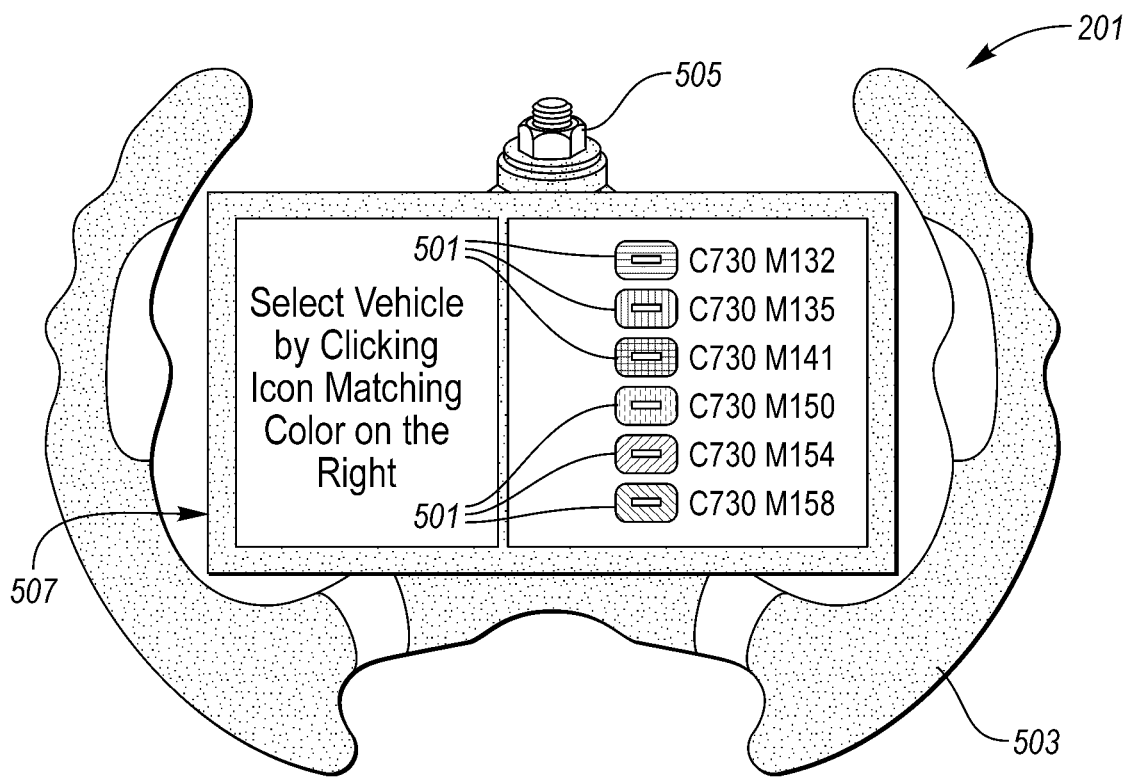
FIG. 5A illustrates an embodiment of a graphical interface of the portable interface device.

FIG. 5A is an example of a graphical interface of the portable interface device. The PID 201 may include a steering wheel interface 503 that may be utilized to manually drive or operate an autonomous vehicle. An input 505 of the PID may connect to an autonomous vehicle to communicate data between the PID 201 and to allow the steering wheel interface 503 to operate the autonomous vehicle. The input 505 may be any mechanical or electromechanical connection. The PID 201 may include a display 507 that includes a user interface. The display 507 may include an interface that shows vehicle identifiers that include a color-coded icon 501. The color-coded icons 501 may include different colors for each vehicle. Each color of the icons 501 will coordinate with a light located on the vehicle that will emit the same color.

Figure 5B:
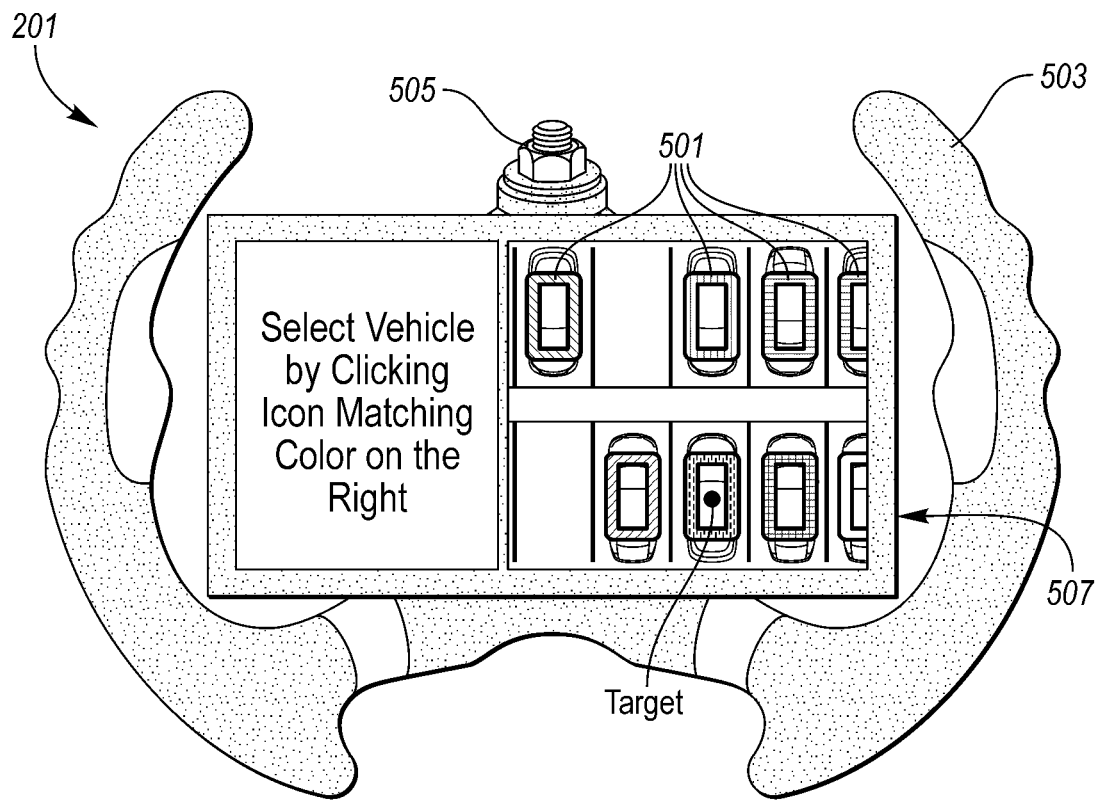
FIG. 5B illustrates another embodiment of a graphical interface of the portable interface device.

FIG. 5B is another example of a graphical interface of the portable interface device. The PID 201 may include a display 507 configured to display a map (e.g. Cartesian map) of the assumed or calculated position a vehicle based on their GPS coordinates. The map may display multiple vehicles that are available or within a vicinity of the PID 201. The interface may allow a user to select one or more vehicles from the map. The vehicles may include color coded icons 503 that may coordinate with lights located on the vehicle that will emit the same color as the icon 503. Selection of the map may then bring up a menu of options or functions for the user to choose from with respect to the vehicle. Each vehicle may have various functions unique to them that may be activated from the PID.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A portable interface (PI), comprising:
a handheld device that includes:
a wireless transceiver configured to emit a short-range wireless signal including an encrypted packet configured to prompt one or more authorized autonomous vehicles to respond to the packet with identification and location data of the vehicles from outside of the one or more authorized autonomous vehicles; and
a processor configured to cause the transceiver to emit the signal, and in response to receiving the identification and location data, prompt a notification to be output on a display of the portable interface to a shortest-distance autonomous vehicle of the one or more authorized autonomous vehicles.

2. The portable interface of claim 1, wherein the wireless signal corresponds to an orientation of the PI.

3. The portable interface of claim 2, wherein the orientation is determined by the processor utilizing a gyroscope and magnetometer of the PI.

4. The portable interface of claim 1, further comprising a display of the PI including a user interface configured to allow a user to operate vehicle driving capabilities of the autonomous vehicle.

5. The portable interface of claim 4, wherein the user interface is configured to output a candidate list on a display of the portable interface when the portable interface is outside of the one or more authorized autonomous vehicles, wherein the candidate list includes the location data of the authorized autonomous vehicles.

6. The portable interface of claim 5, wherein the user interface is further configured to send a drive command to the authorized autonomous vehicles in response to a selection from the candidate list, wherein the drive command requests the authorized autonomous vehicles to drive to the portable interface.

7. The portable interface of claim 4, wherein the user interface is configured to output a candidate list that includes the identification data of the one or more authorized autonomous vehicles.

8. The portable interface of claim 7, wherein the user interface is further configured to send a wireless drive command to the authorized autonomous vehicles in response to a selection from the candidate list, wherein the wireless drive command requests the authorized autonomous vehicles to drive to the PI.

9. The portable interface of claim 1, wherein the PI is further configured to allow a user to operate the authorized autonomous vehicles utilizing a steering wheel interface.

10. The portable interface of claim 9, wherein the steering wheel interface is configured to couple to a steering-wheel input of the authorized autonomous vehicles.

11. The portable interface of claim 1, wherein the notification includes turning on headlights of the autonomous vehicle.

12. The portable interface of claim 1, wherein the identification data includes one or more color codes corresponding to one or more colored lights emitted from the vehicles.

13. The portable interface of claim 12, wherein the color codes correspond to different colors at each vehicle.

14. The portable interface of claim 1, wherein the wireless signal is Bluetooth Low Energy.

15. A method of communicating with an autonomous vehicle utilizing a portable interface device (PID), comprising:
outputting a short-range wireless signal including an encrypted packet;
receiving a response from the vehicle including a vehicle identifier and location data when the PID is outside of the autonomous vehicle; and
in response to the vehicle identifier, sending a request to a shortest-distance vehicle to output a notification signal at the shortest distance vehicle and output the location on a display of a user interface.

16. The method of claim 15, wherein the method further includes providing a steering wheel interface configured to operate the autonomous vehicle when the PID is inside the autonomous vehicle.

17. The method of claim 15, wherein the method further includes determining an orientation of the PID utilizing a gyroscope and magnetometer.

18. The method of claim 17, wherein an output angle of the short-range wireless signal is based on the orientation.

19. An autonomous vehicle, comprising:
a wireless transceiver configured to receive a Bluetooth Low Energy (BLE) signal emitted from a handheld device located remotely from the vehicle; and
a processor configured to:
in response to receiving an encrypted packet from the handheld device, send a vehicle identifier and vehicle location utilizing the signal when the handheld device is outside of the autonomous vehicle; and
output a notification to the handheld device in response to receiving data indicating the vehicle is a shortest-distance vehicle to the handheld device located remotely from the autonomous vehicle.

20. The autonomous vehicle of claim 19, wherein the processor is further configured to:
in response to a command request received from the handheld device, drive the vehicle to a location of the handheld device.

* * * * *